(12) United States Patent
Kluge

(10) Patent No.: US 11,132,873 B2
(45) Date of Patent: Sep. 28, 2021

(54) WHEEL FOR SELECTING A SWEEPSTAKES OR RAFFLE WINNER

(71) Applicant: Darrel G. Kluge, New Hope, MN (US)

(72) Inventor: Darrel G. Kluge, New Hope, MN (US)

( * ) Notice: Subject to any disclaimer, the term of this patent is extended or adjusted under 35 U.S.C. 154(b) by 0 days.

(21) Appl. No.: 16/738,833

(22) Filed: Jan. 9, 2020

(65) Prior Publication Data
US 2020/0226874 A1  Jul. 16, 2020

Related U.S. Application Data

(60) Provisional application No. 62/792,136, filed on Jan. 14, 2019.

(51) Int. Cl.
*G07F 17/32* (2006.01)
*G06Q 20/04* (2012.01)

(52) U.S. Cl.
CPC ........ *G07F 17/329* (2013.01); *G07F 17/3211* (2013.01); *G06Q 20/0457* (2013.01)

(58) Field of Classification Search
CPC  G07F 17/329; G07F 17/3211; G06Q 20/0457
See application file for complete search history.

(56) References Cited

U.S. PATENT DOCUMENTS

| | | | | |
|---|---|---|---|---|
| 6,217,022 | B1* | 4/2001 | Astaneha | A63F 5/043 273/138.1 |
| 8,740,217 | B2* | 6/2014 | Thibault | A63F 5/02 273/142 E |
| 10,235,830 | B2* | 3/2019 | Richardson | G07F 17/3209 |
| 10,796,531 | B2* | 10/2020 | Mayeroff | G07F 17/3267 |
| 2004/0082378 | A1* | 4/2004 | Peterson | G07F 17/32 463/20 |
| 2011/0223983 | A1* | 9/2011 | Schwartz | G07F 17/3283 463/17 |
| 2012/0270630 | A1* | 10/2012 | Bontempo | G07F 17/3225 463/18 |
| 2013/0260857 | A1* | 10/2013 | Nordby | G07F 17/329 463/17 |
| 2014/0113698 | A1* | 4/2014 | Rakestraw | G07F 17/3239 463/20 |
| 2015/0379831 | A1* | 12/2015 | Lee | G07F 17/326 463/20 |
| 2016/0042591 | A1* | 2/2016 | Bernard | G07F 17/3211 463/20 |
| 2017/0053474 | A1* | 2/2017 | Harris | G07F 17/3267 |
| 2017/0140606 | A1* | 5/2017 | Kolesov | G07F 17/323 |
| 2018/0225910 | A1* | 8/2018 | Kawai | A63F 13/80 |
| 2020/0372762 | A1* | 11/2020 | Baskerville | G07F 17/329 |

* cited by examiner

*Primary Examiner* — Malina D. Blaise
(74) *Attorney, Agent, or Firm* — Weiss & Moy, P.C.; Jeffrey D. Moy

(57) ABSTRACT

A sweepstakes wheel and method wherein the sweepstakes wheel has a round wheel including a front surface having one to nine circular rings displayed thereon. Each circular ring may be divided into a plurality of equally sized sections, each section designating a number wherein each circular ring includes enough sections to include all number options available to determine a single digit of a sweepstakes winning entry number. The sweepstakes wheel may be used to select the winning number from a variable and potentially large number of entries by rotating the wheel to determine the different numbers of the sweepstakes winning entry number.

7 Claims, 14 Drawing Sheets

WHEEL FOR SELECTING A SWEEPSTAKES OR RAFFLE WINNER

RELATED APPLICATIONS

This patent application is related to U.S. Provisional Application No. 62/792,136 filed Jan. 14, 2019, entitled "WHEEL FOR SELECTING A SWEEPSTAKES OR RAFFLE WINNER" in the name of Darrel G. Kluge, and which is incorporated herein by reference in its entirety. The present patent application claims the benefit under 35 U.S.C. § 119(e).

FIELD

The present invention relates to a sweepstakes wheel, and more specifically, a game-of-chance sweepstakes wheel that determines a winning number or ticket from a variable and potentially large number of entries wherein the wheel is spun two or more times to determine a winning entry from eleven or more entries and/or tickets.

BACKGROUND

Sweepstakes and raffles have been around for many years. Sweepstakes and raffles have a universal appeal as they offer a fun and easy way to win prizes for free, and by paid entry. In recent years, sweepstakes and raffles have gained in popularity as marketing promotions. The use of a sweepstakes or raffle to market a business or product or to raise funding for an entity, event or cause is recognized as a common marketing or fundraising means for many companies or individuals.

A sweepstake is a type of contest where a prize or prizes may be awarded to a winner or winners. Sweepstakes began as a form of lottery that were tied to products sold. In response, the FCC and FTC refined U.S. broadcasting laws (creating the anti-lottery laws). Under these laws sweepstakes became strictly "No Purchase Necessary to Enter or Win" and "A Purchase Will not Increase Your Chances of Winning", especially since many sweepstakes companies skirted the law by stating only "No Purchase Necessary to Enter", removing the consideration (one of the three legally required elements of gambling) to stop abuse of sweepstakes. Today, sweepstakes in the USA are used as marketing promotions to reward existing consumers, obtain customer information and to draw attention to a product. By definition, the winner is determined by luck rather than skill.

Alternatively, a raffle is a gambling competition in which people obtain numbered tickets, each ticket having the chance of winning a prize. Traditionally, the winners are drawn from a container holding a copy of every number. The drawn tickets are checked against a collection of prizes with numbers attached to them, and the holder of the ticket wins the prize. The raffle is a popular game in numerous countries and is often held to raise funds for a specific charity or event.

The problems with most raffles and sweepstakes are that they are not very entertaining for participants. Participants generally purchase a ticket and then a winning ticket is drawn with no user participation.

Therefore, it would be desirable to provide a system and method that overcome the above identified concerns, as well as additional challenges which will become apparent from the disclosure set forth below. The present embodiments offer an entertaining means for selecting the winning entry or entries in a sweepstakes or raffle through the use of a sweepstakes/raffle wheel. The wheel of the present embodiments creates excitement in the selection process by systematically determining each digit of a winning entry through a series of wheel spins.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a method of playing a sweepstakes is disclosed. The method comprises: distributing a undetermined number of tickets, wherein the tickets are numbered numerically in order; providing a sweepstakes wheel, the sweepstakes wheel comprising: a wheel having a front surface; a plurality of rings formed on the front surface, wherein each ring is divided into a plurality of sections, each section having a number from through 0-9; a plurality of slowing devices extending out from a perimeter of each ring; a pointer indicating one of the plurality of rings and a selected section in the one of the plurality of rings indicated; determining a total number of the tickets distributed; spinning the wheel a first time with the pointer engaging an outer ring of the plurality of rings to determine a first number of a winning ticket, the first number being a rightmost digit of the winning ticket; recording the first number of the winning ticket indicated by the pointer after spinning the wheel the first time; declaring the winning ticket when the first number indicated on the outer ring is greater than a rightmost digit of the total number of the tickets distributed when the total number of the tickets distributed is a double-digit number; spinning the wheel a second time to determine a second number of a winning ticket, the second number being adjacent and to the left of the rightmost digit of the winning ticket when the first number indicated on the outer ring is less than a rightmost digit of the total number of the tickets distributed and the total number of the tickets distributed is a double-digit number or larger, the pointer engaging a ring of the plurality of rings that addresses a number that is one less than a right most digit of the total number of the tickets distributed when the total number of the tickets distributed is a double-digit number; recording the second number of the winning ticket indicated by the pointer after spinning the wheel the second time; and declaring the winning ticket when the first number of the winning ticket and the second number of the winning ticket are recorded and the total number of the tickets distributed is the double-digit number.

BRIEF DESCRIPTION OF THE DRAWINGS

Embodiments of the disclosure will become more fully understood from the detailed description and the accompanying drawings, wherein.

DESCRIPTION OF THE INVENTION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure relates to a sweepstakes wheel and method. The sweepstakes wheel may be a physical sweepstakes wheel or an electronic sweepstakes wheel. If the sweepstakes wheel is an electronic sweepstakes wheel, spinning of the electronic sweepstakes may be determined by a random number generator. The sweepstakes wheel may be comprised of a round wheel base including a front surface having one to nine circular rows or rings (hereinafter rings) displayed thereon. Each circular ring may be divided into a plurality of equally sized sections, each section designating a number wherein each circular ring includes enough sections to include all number options available to determine a single digit of a sweepstakes winning entry number. The sweepstakes wheel may be used to select the winning number from a variable and potentially large number of entries as may be explained below.

Figure 1:
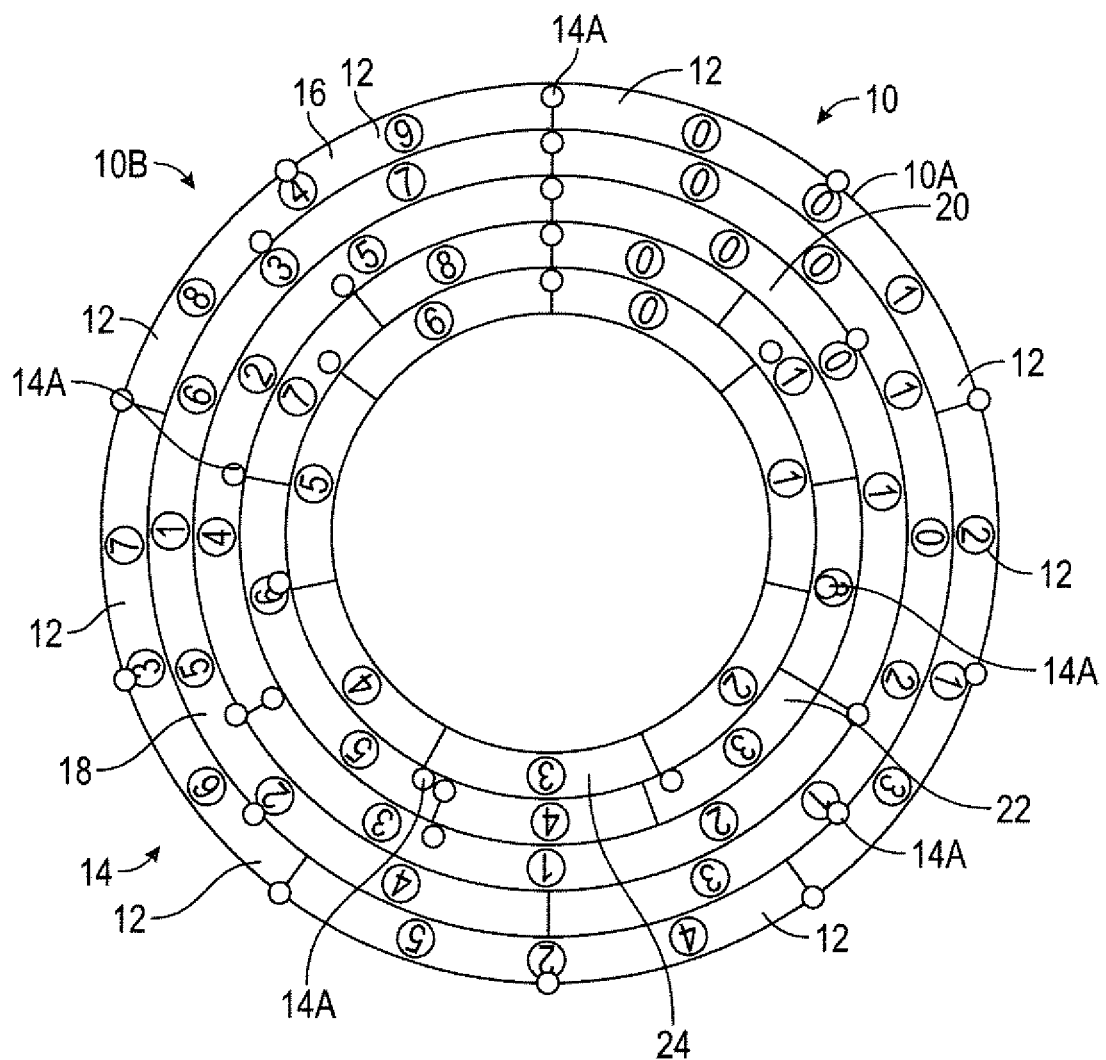
FIG. 1 is a front view of an exemplary sweepstakes/raffle wheel in accordance with one embodiment of the present invention.
Figure 2:
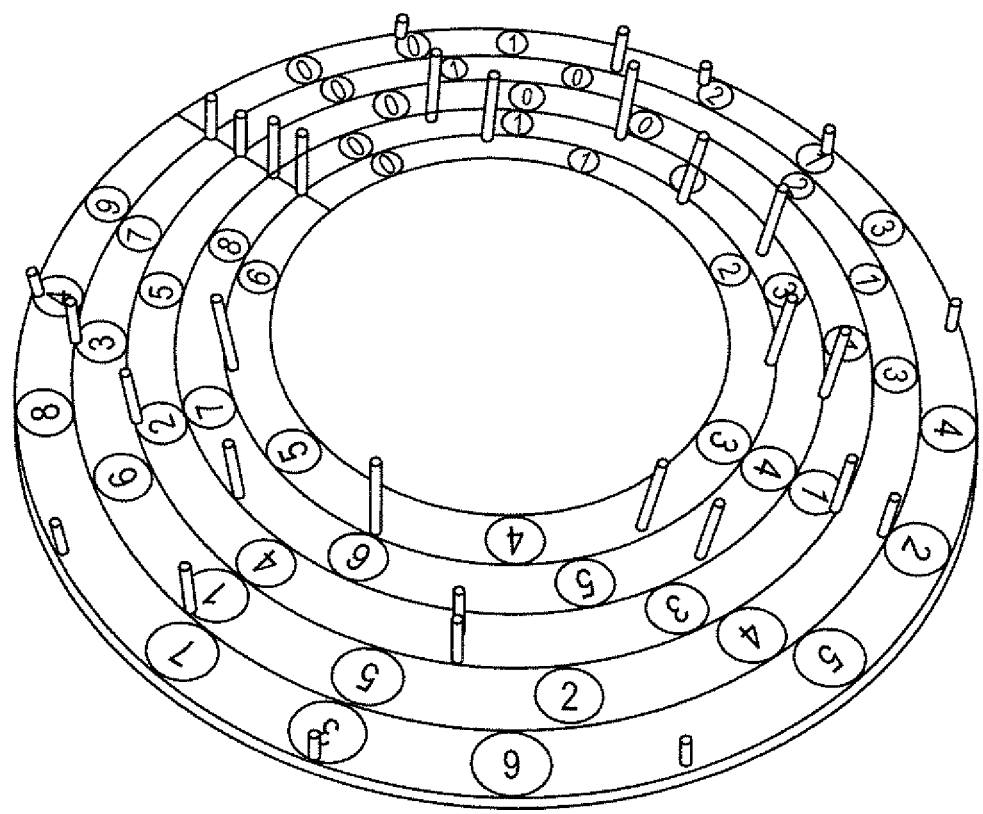
FIG. 2 is a front perspective view of the exemplary sweepstakes/raffle wheel of FIG. 1 in accordance with one embodiment of the present invention.
Figure 3:
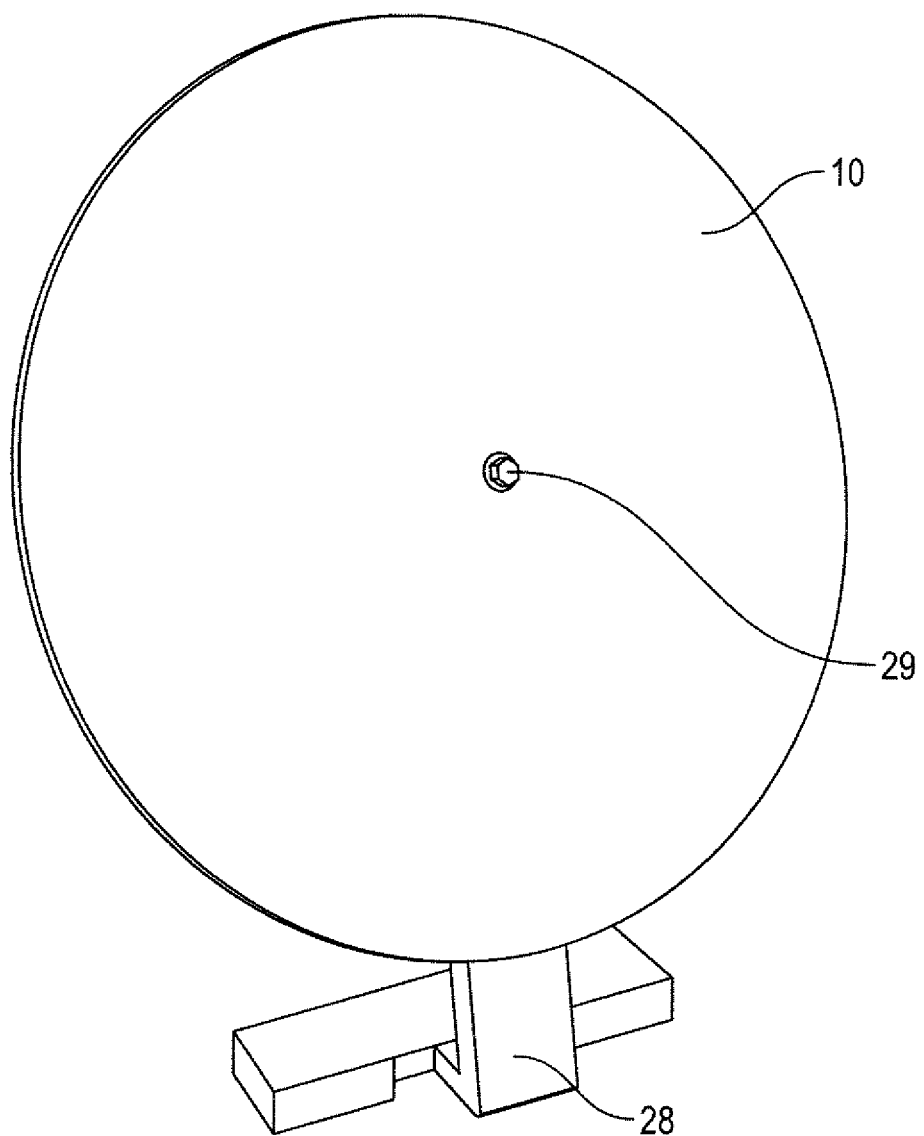
FIG. 3 is a front perspective view the exemplary sweepstakes/raffle wheel of FIG. 1 with the rings and numbering removed and a base and mounting pedestal included in accordance with one embodiment of the present invention.
Figure 4:
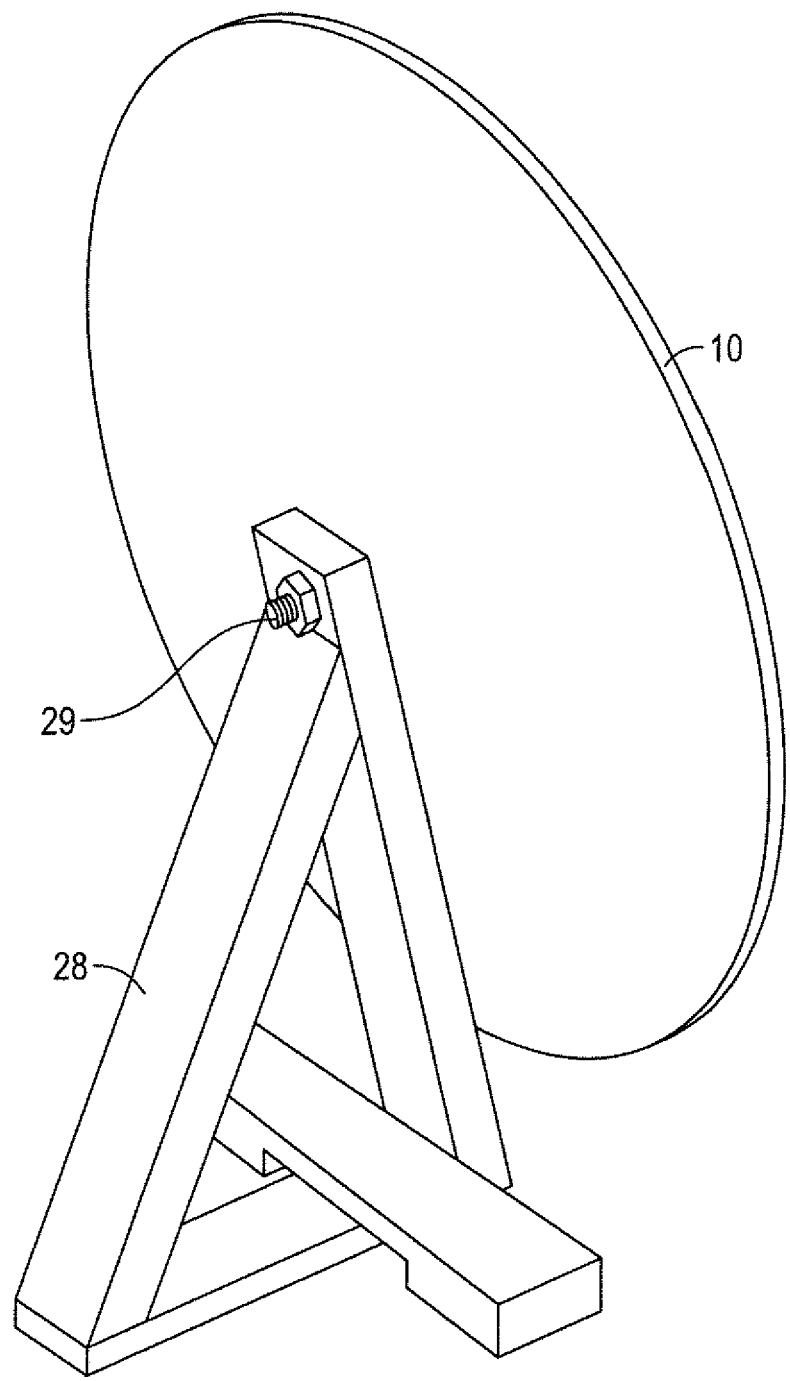
FIG. 4 is a rear perspective view of the exemplary sweepstakes/raffle wheel of FIG. 3 in accordance with one embodiment of the present invention.
Figure 5:
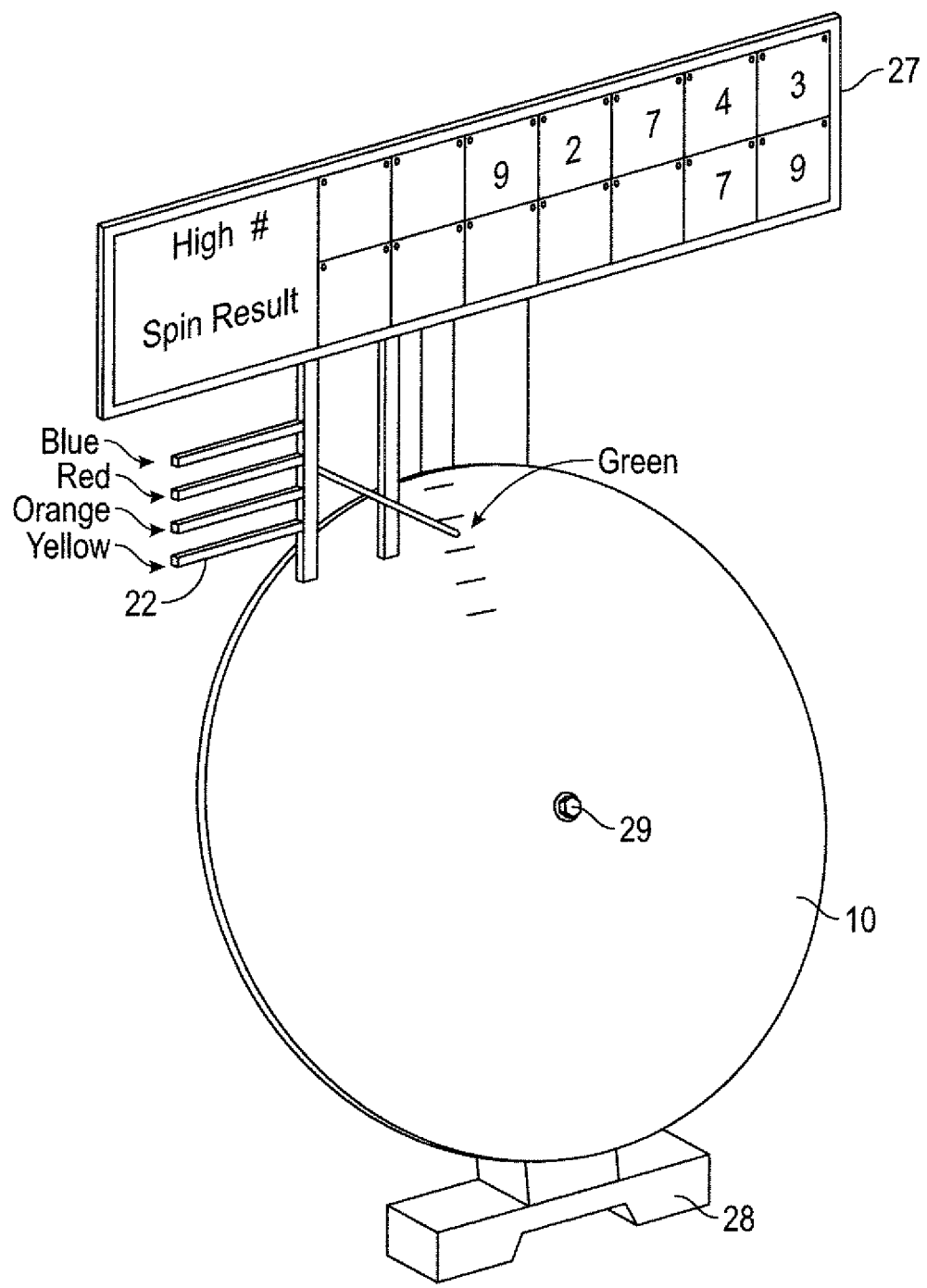
FIG. 5 is a front perspective view of the exemplary sweepstakes/raffle wheel of FIG. 1 with the rings and numbering removed and a base, mounting pedestal, signage and pointers included in accordance with one embodiment of the present invention.

Referring to FIG. 1, the sweepstakes wheel generally comprises a wheel 10 including a front surface 10A having a plurality of rings or circular rows 10B (hereinafter rings 10B) formed thereon. Each ring 10B may be defined by having an inner diameter and an outer diameter. In general, the wheel 10 may have five to nine rings 10B formed thereon. In one embodiment, five rings 10B may be formed. Each ring 10B of the wheel 10 may be partitioned into a plurality of equal sized sections that represent a separate number for each section.

FIGS. 1-5 depicts one embodiment of the wheel 10 of the present invention wherein the front surface 10A displays five circular rings 10B, each having two or more equal sized sections 12 separated by wheel slowing devices 14, wherein the sections 12 collectively address all possible positive integers (i.e. 0-9) for each entry digit, which could encompass any total number of entries submitted in a sweepstakes or raffle. The slowing devices 14 may be used to slow the wheel 10 after the wheel 10 has been spun. The slowing devices 14 engage a pointer 22 of the wheel 10. The pointer 22 may be used to indicate a positive integer on one of the circular rings 10B.

In accordance with one embodiment, the front surface displays five circular rings 10B. An outer ring 16 may be divided into ten (10) equal sections beginning at top dead center, or 0 degrees, with each section being 36 degrees in width advanced from the last. A second ring 18 may be divided into eight (8) equal sections beginning at top dead center, or 0 degrees, with each section being 45 degrees in width advanced from the last. The third ring 20 may be divided into six (6) equal sections beginning at top dead center, or 0 degrees, with each section being 60 degrees in width advanced from the last. The fourth ring 22 may be divided into nine (9) equal sections beginning at top dead center, or 0 degrees, with each being 40 degrees in width advanced from the last. The fifth and inner ring may be divided into seven (7) equal sections beginning at top dead center, or 0 degrees, with each being 51.43 degrees in width advanced from the last.

The slowing devices 14 depicted in the FIGs. and in various embodiments may be wooden dowels/pegs 14A (hereinafter pegs 14A) that may be placed at even intervals around the perimeter of their respective rings 10B. In the embodiments depicted in the FIGS. 1-5, the pegs 14 on the outer ring 10B may be the shortest. In accordance with one embodiment, the pegs 14B on the outer ring 10B may extend 1 inch from the front surface 10A. The pegs 14B may then get progressively longer for each successive inward ring 10B. For example, pegs 14B may then get progressively longer by a half an inch per ring 10B as they move towards the center (i.e., 1", 1.5", 2", 2.5", and 3"). The pegs 14 are used in connection with the appropriate color coordinated pointer 22, only one pointer 22 can be used during a spin and it is the one moved into the top dead center position.

The wheel 10 may be fixed to a pedestal or stand 28 (hereinafter stand 28). The stand 28 may be used for ease in spinning the wheel 10 and also to better see the results of the spins. A bolt 29 may be used to affix the wheel 10 to the stand 28. A bearing may be used with the bolt 29 for near effortless spinning.

Figure 6:
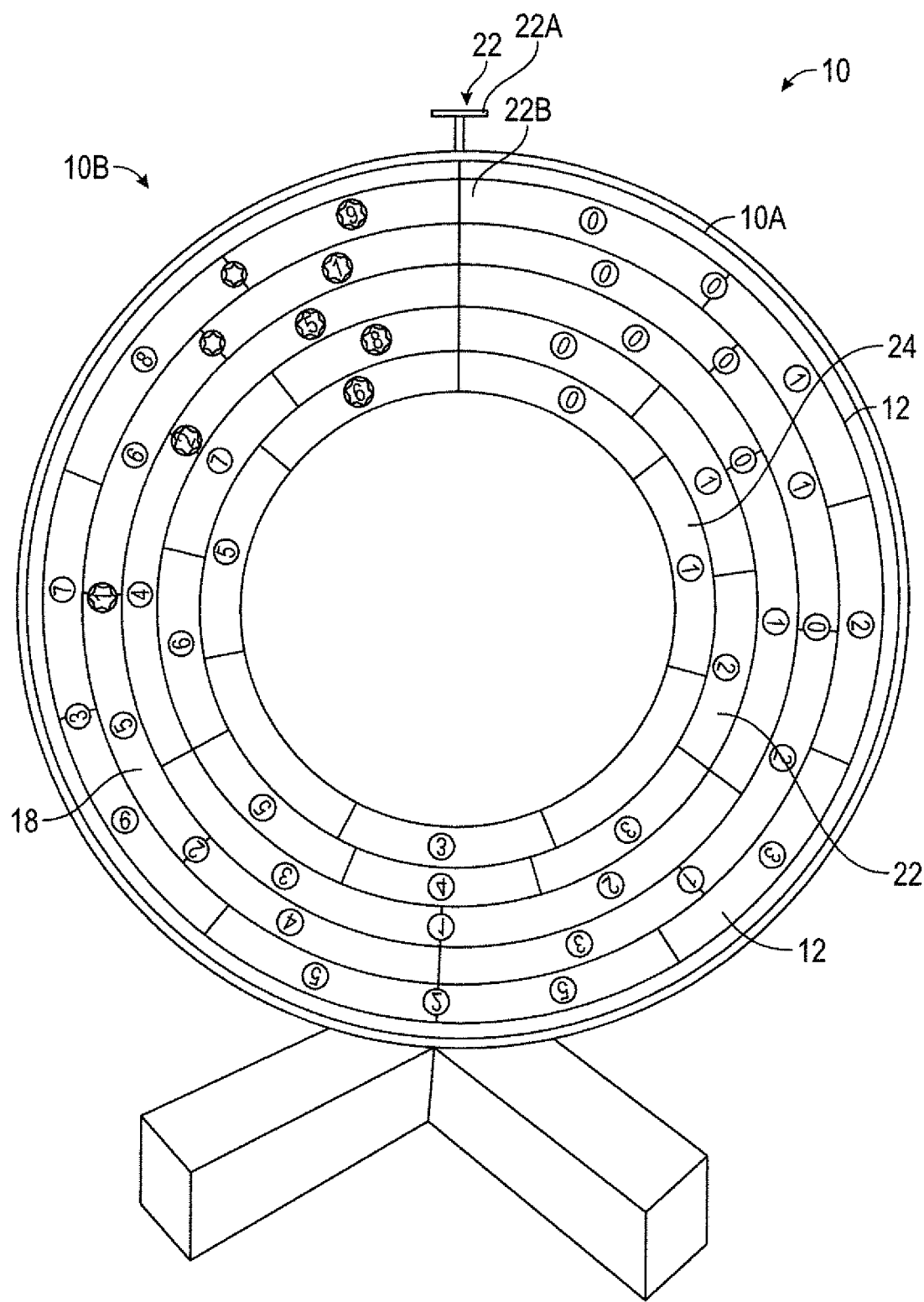
FIG. 6 is a front perspective view of another exemplary sweepstakes/raffle wheel with the base and mounting pedestal included in accordance with one embodiment of the present invention.
Figure 7:
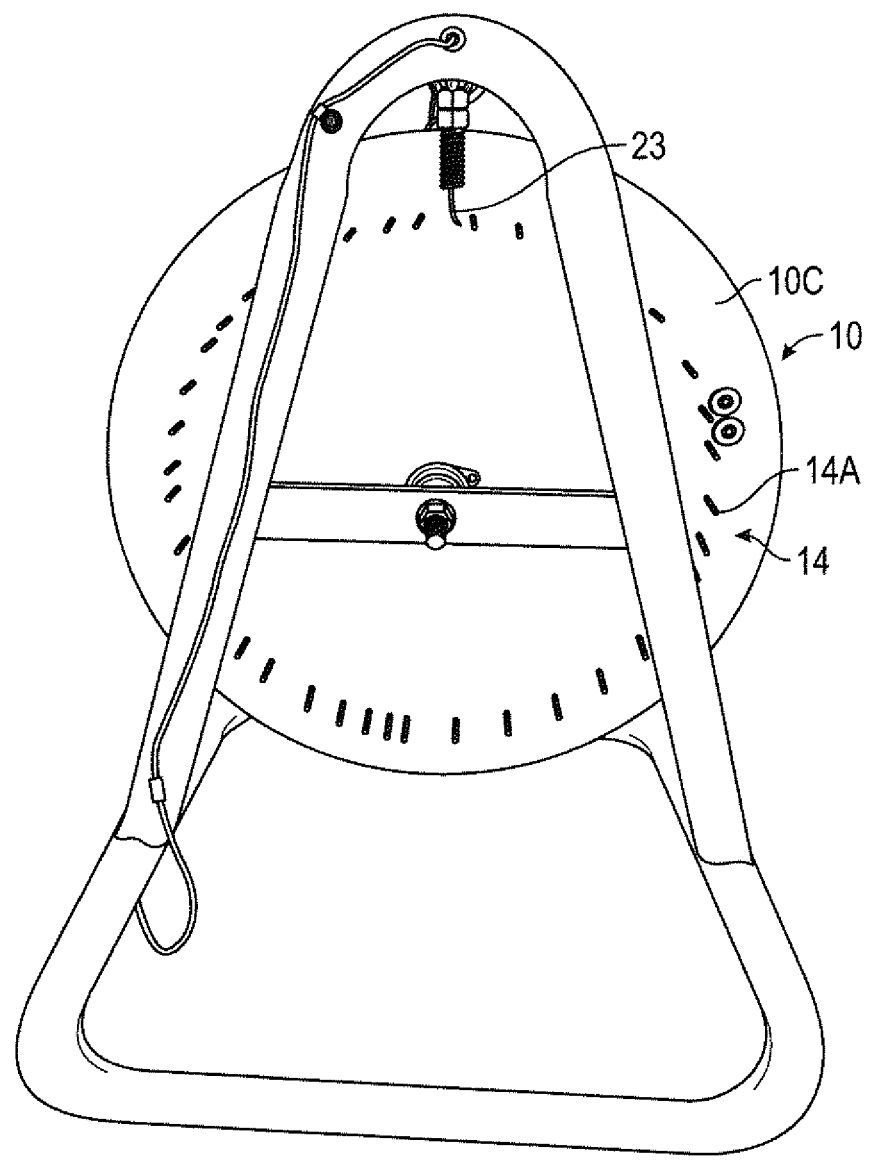
FIG. 7 is a rear perspective view of the exemplary sweepstakes/raffle wheel of FIG. 6 in accordance with one embodiment of the present invention.
Figure 8:
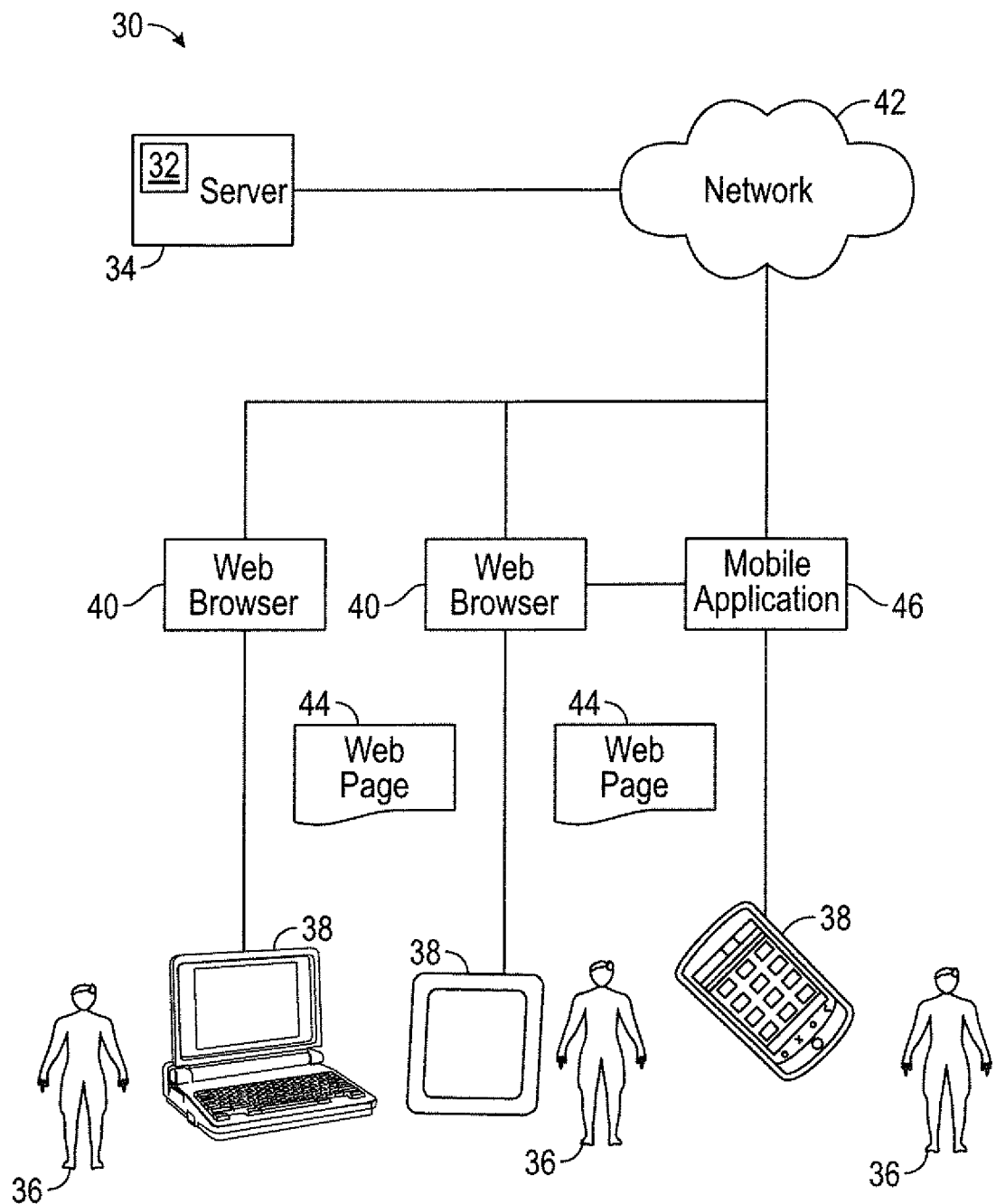
FIG. 8 is a block diagram of an exemplary sweepstakes/raffle system in accordance with one embodiment of the present invention.
Figure 9:
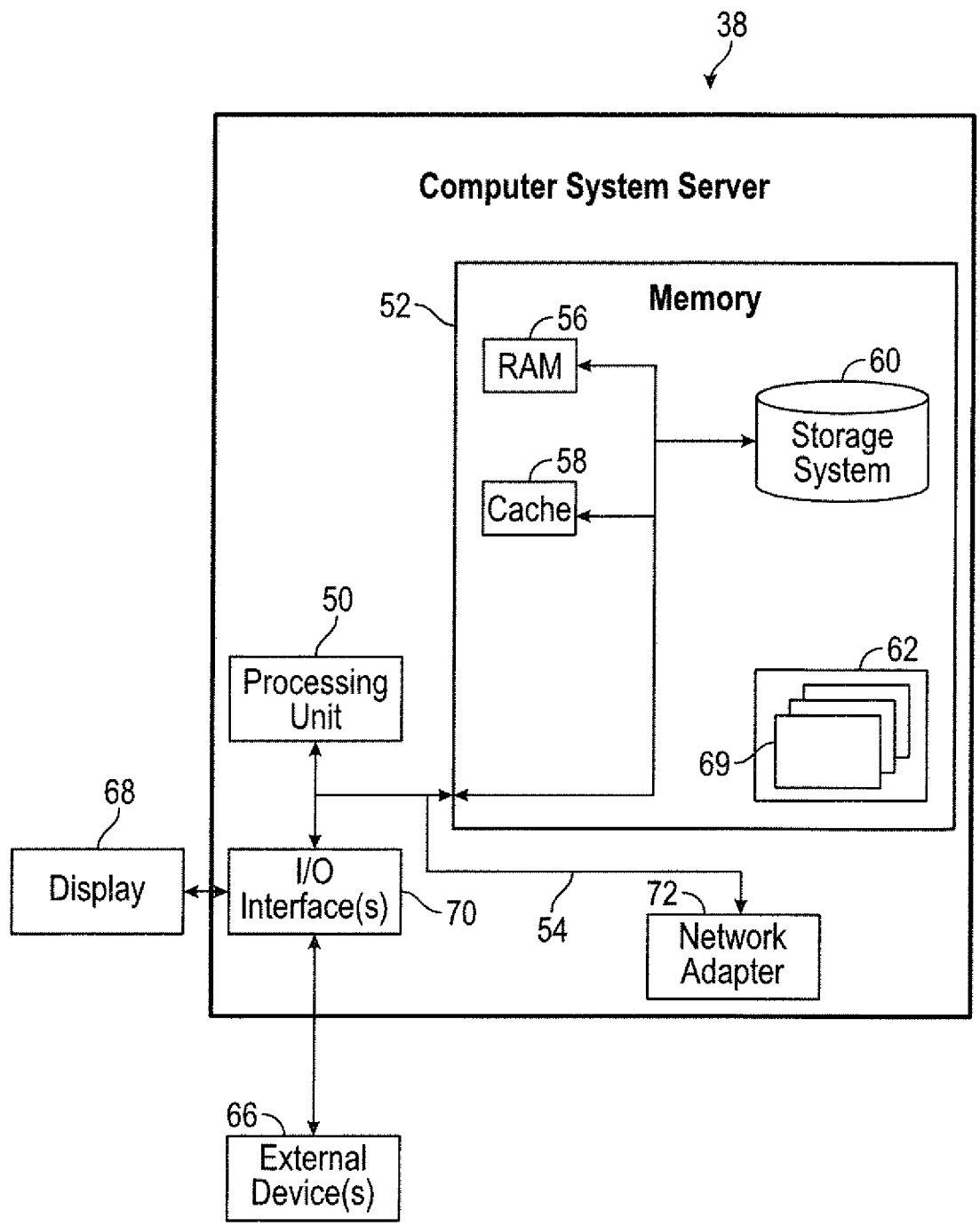
FIG. 9 is a block diagram of an exemplary computing device used in the sweepstakes/raffle system of FIG. 6 in accordance with one embodiment of the present invention.
Figure 10:
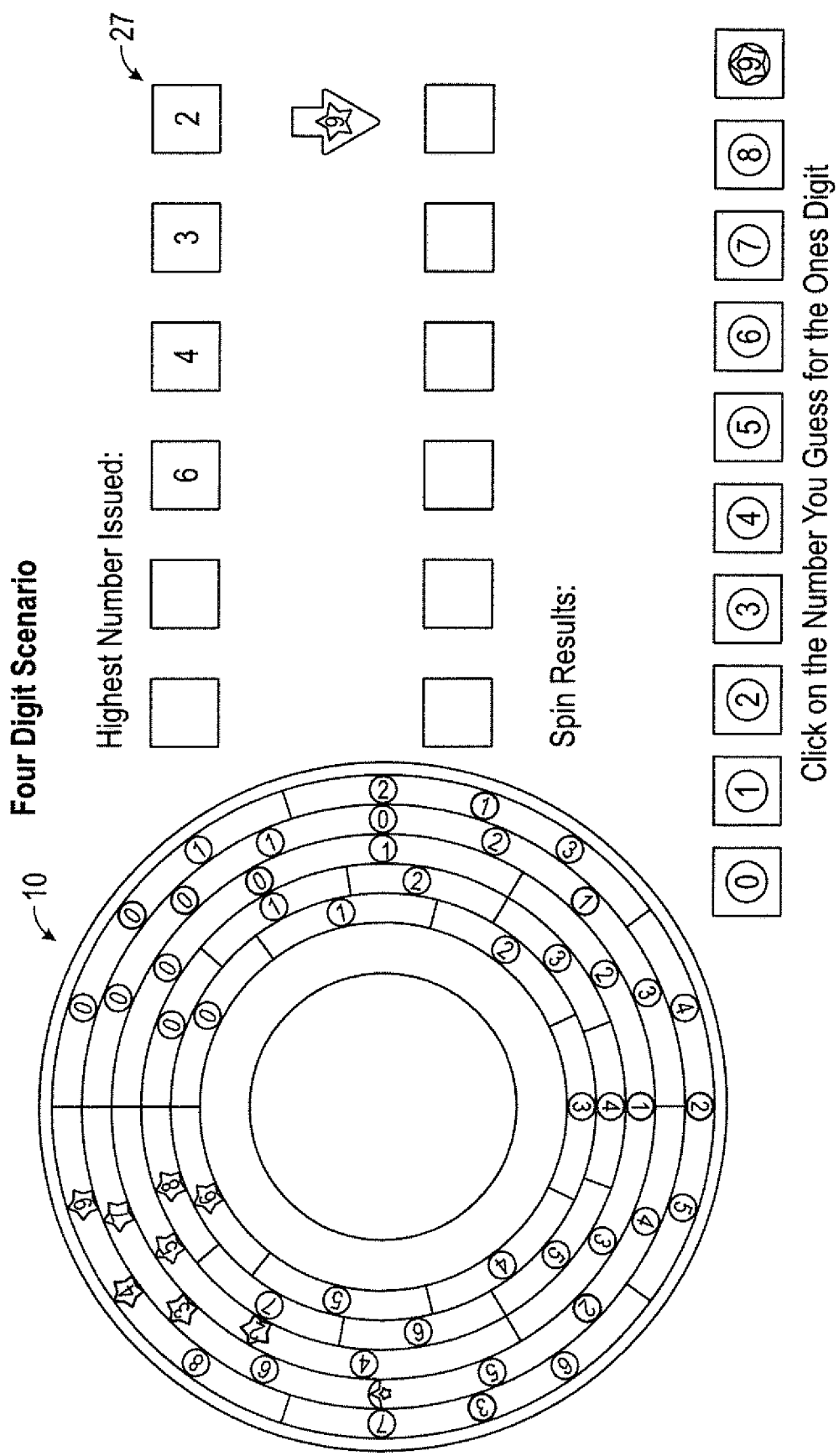
FIG. 10 is an exemplary computing device of the sweepstakes/raffle system in use in accordance with one embodiment of the present invention.
Figure 11:
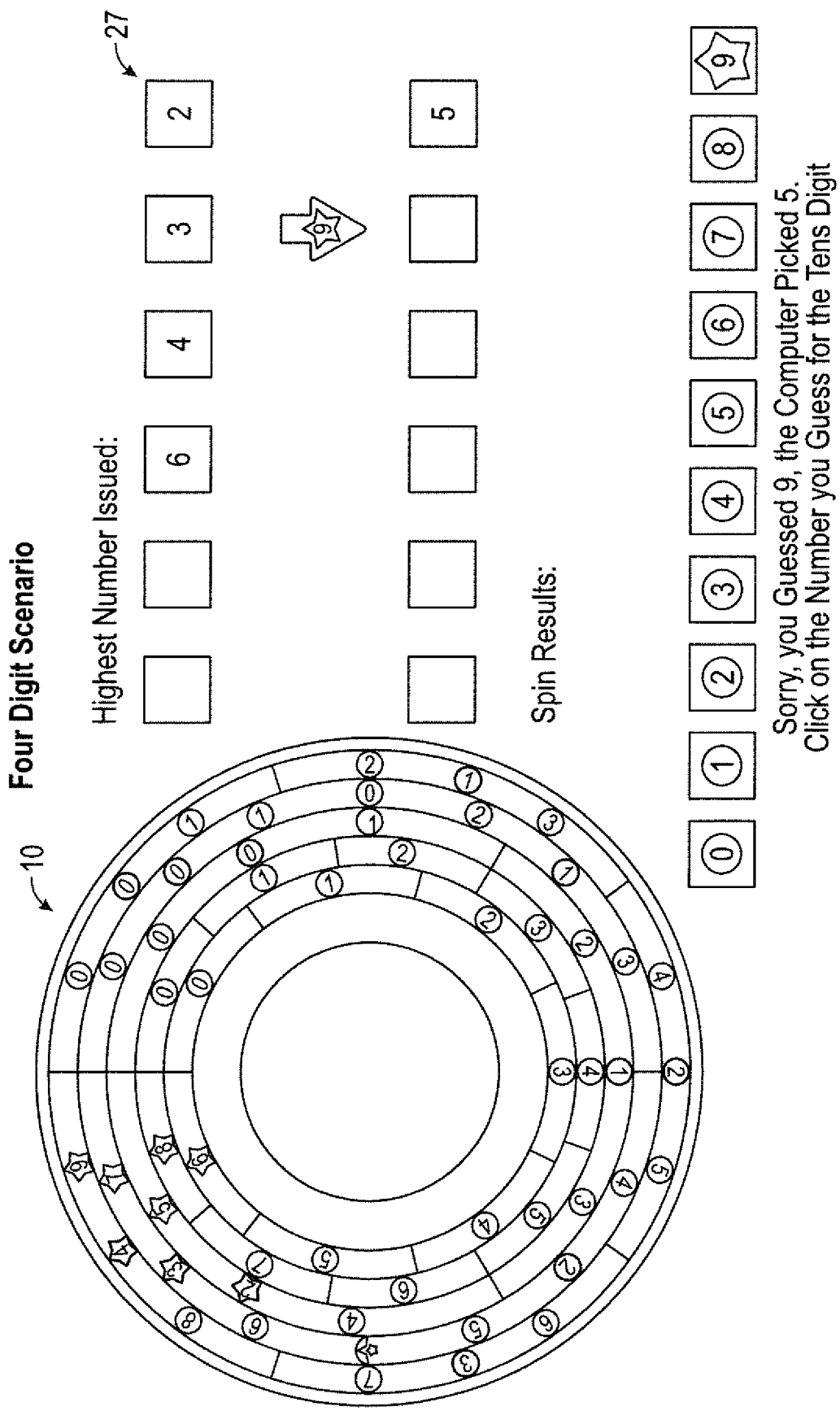
FIG. 11 is an exemplary computing device of the sweepstakes/raffle system in use in accordance with one embodiment of the present invention.
Figure 12:
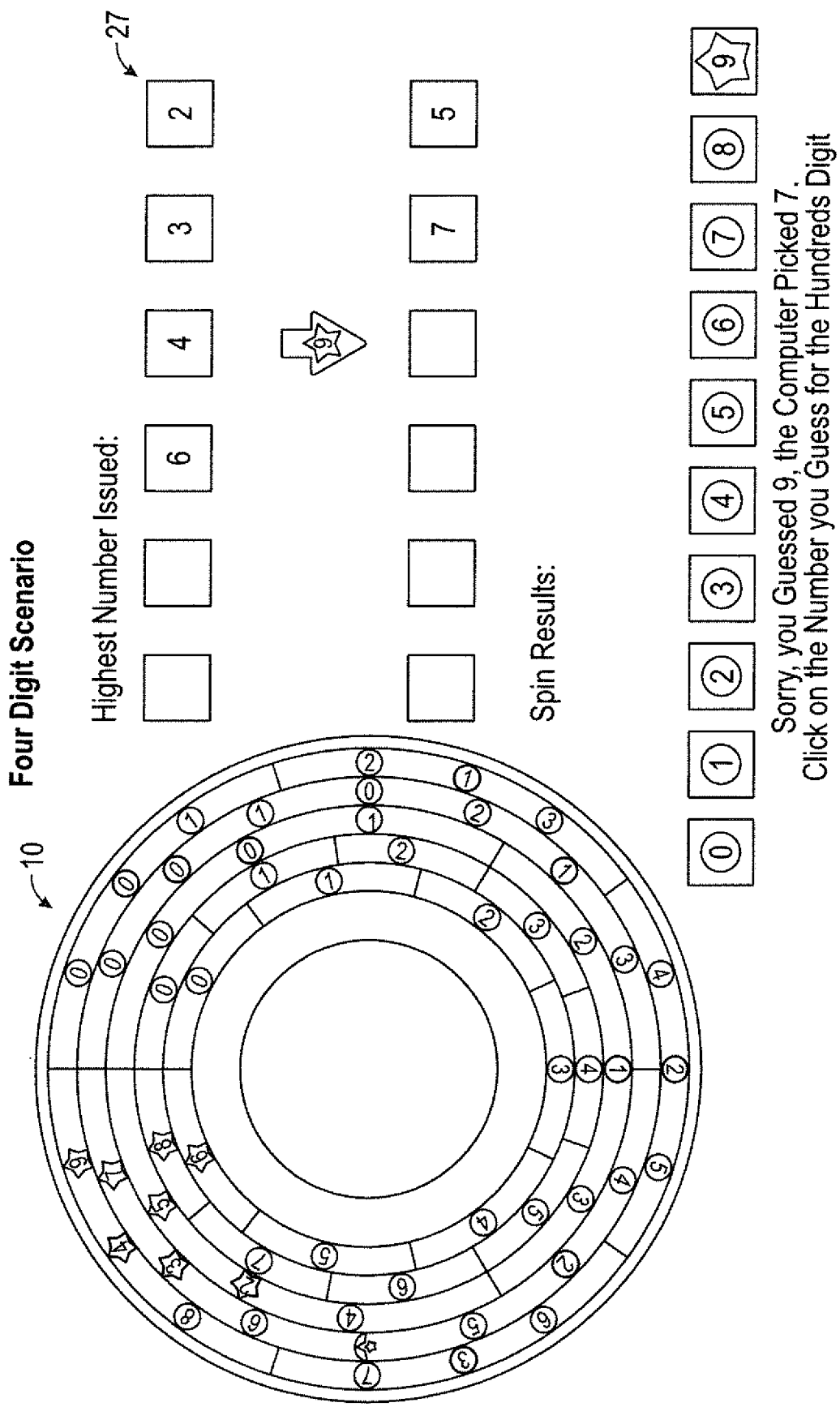
FIG. 12 is an exemplary computing device of the sweepstakes/raffle system in use in accordance with one embodiment of the present invention.
Figure 13:
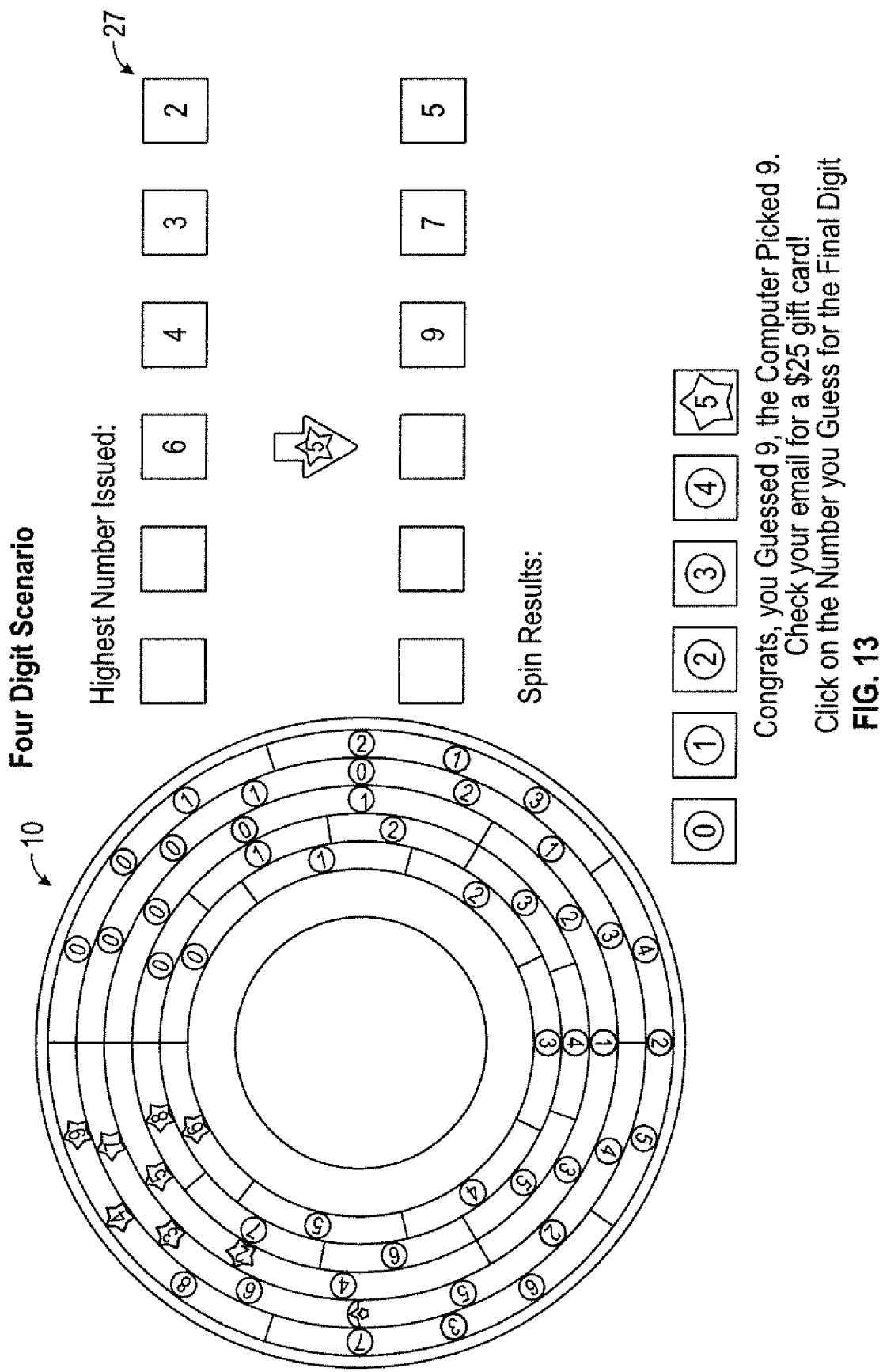
FIG. 13 is an exemplary computing device of the sweepstakes/raffle system in use in accordance with one embodiment of the present invention.
Figure 14:
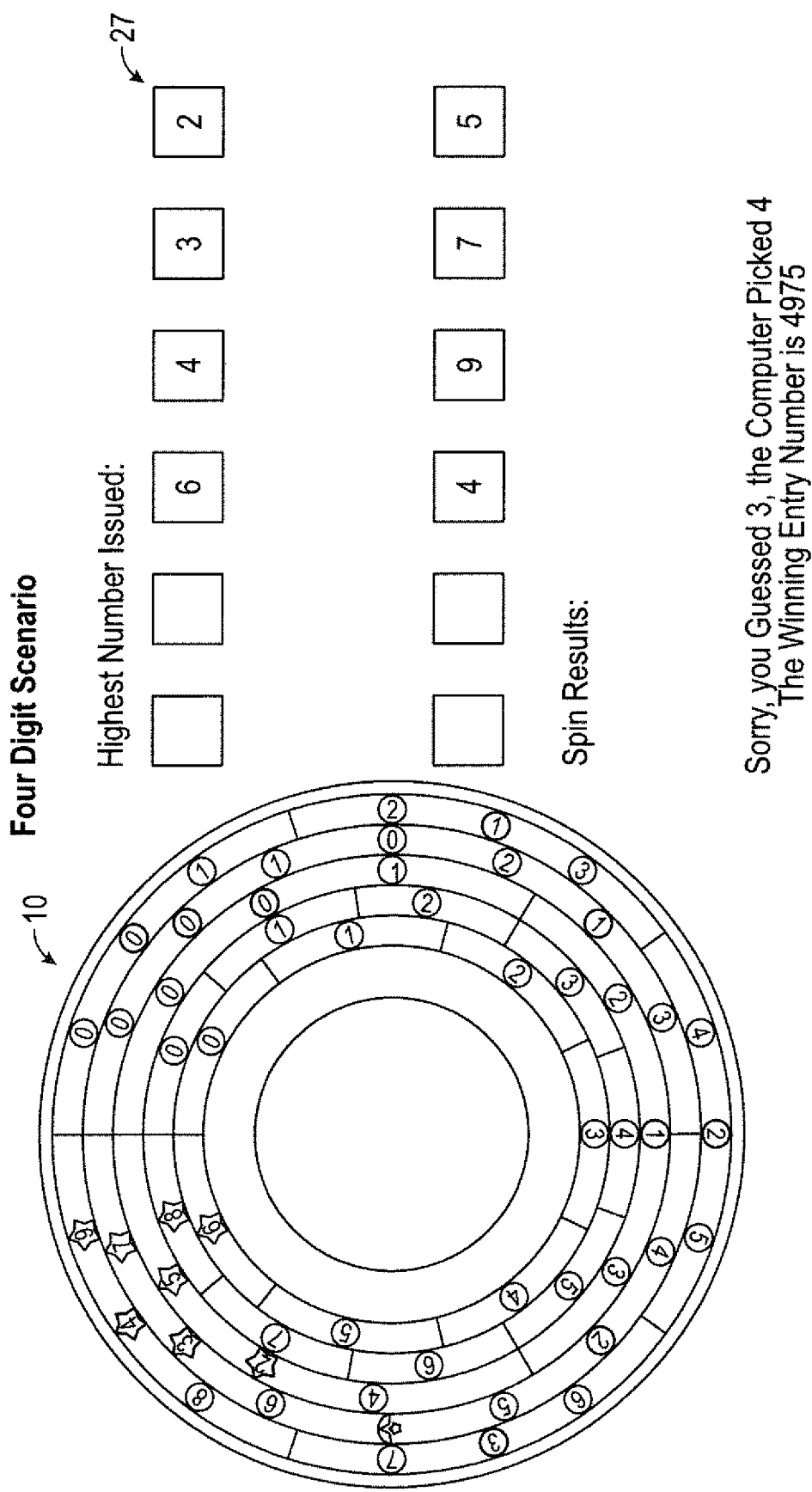
FIG. 14 is an exemplary computing device of the sweepstakes/raffle system in use in accordance with one embodiment of the present invention.

Referring to FIGS. 6-7, in this embodiment, the slowing devices 14 have been removed from the front surface 10A of the wheel 10 and placed on a rear surface 10C. The slowing devices 14 depicted in FIGS. 6-7 and in the above various embodiments may be wooden dowels/pegs 14A (hereinafter pegs 14A) that may be placed at even intervals around the perimeter of the rear surface 10C of the wheel 10. A hinged flap 23 may be attached to the stand 28. The hinged flap 23 may engage the slowing devices 14 in order to slow down and stop the wheel 10 from rotating after the wheel 10 has been spun.

In the present embodiment, the pointer 22 may be a laser light 22A. the laser light 22A may be affixed to the stand 28. The laser light 22A may emit a light 22B to indicate which section 12 in each of the circular rings 10B has been selected.

Referring to FIG. 6, as disclosed above, the sweepstakes wheel may be a physical or electronic. If electronic, a system 30 may be used for running the sweepstake/raffle. The system 30 may provide a platform 32 that may for running the sweepstakes/raffle as may be described below. The system 30 may have a server 34. The server 34 may be used to host the platform 32 of the present invention. Individuals 36 may use one or more computing devices 38 to access the platform 32 that may be hosted on the server 34. The computing devices 38 may be a personal computer system, tablet device, handheld or laptop device, mobile phone device, server computer system, multiprocessor system, microprocessor-based system, set top boxes, programmable consumer electronics, network PCs, and distributed cloud computing environments that include any of the above systems or devices, and the like. The computing device 18 may be described in the general context of computer system executable instructions, such as program modules, being executed by a computer system as may be described below.

The computing device 38 may be loaded with an operating system. The operating system of the computing device 38 may manage hardware and software resources of the computing device 38 and provide common services for computer programs running on the computing device 38. The computing device 38 may be loaded with a web browser 40. The web browser 40 may allow the computing device 38 to gain online access to a network 32 such as the World Wide Web. The web browser 40 may be Microsoft Internet Explorer, Google® Chrome, Mozilla® Firefox, Apple® Safari or similar browsing applications. By connecting to the network 42, the computing device 38 may access a website 44 associated with the platform hosted on the server 34.

Alternatively, or in addition to, the computing device 38 may download a mobile application 46. The mobile application 46 may access and communicate with the platform 32 hosted on the server 34. By connecting to the network 42, the computing device 38 may access and communicate with the platform 32 hosted on the server 34 via the mobile application 46.

Referring now to FIG. 7, the computing devices 38 may be described in more detail in terms of the machine elements that provide functionality to the systems and methods disclosed herein. The components of the computing devices 38 may include, but are not limited to, one or more processors or processing units 50, a system memory 52, and a system bus 54 that couples various system components including the system memory 52 to the processor 50. The computing devices 38 may typically include a variety of computer system readable media. Such media could be chosen from any available media that is accessible by the computing devices 38, including non-transitory, volatile and non-volatile media, removable and non-removable media. The system memory 52 could include one or more computer system readable media in the form of volatile memory, such as a random access memory (RAM) 56 and/or a cache memory 58. By way of example only, a storage system 60 may be provided for reading from and writing to a non-removable, non-volatile magnetic media device typically called a "hard drive".

The system memory 52 may include at least one program product/utility 62 having a set (e.g., at least one) of program modules 64 that may be configured to carry out the functions of embodiments of the invention. The program modules 64 may include, but is not limited to, an operating system, one or more application programs, other program modules, and program data. Each of the operating systems, one or more application programs, other program modules, and program data or some combination thereof, may include an implementation of a networking environment. The program modules 64 generally carry out the functions and/or methodologies of embodiments of the invention as described herein. For example, the program modules 64 may carry out the steps for initiating a sweepstakes/raffle and other functionality as will be described below.

The computing device 38 may communicate with one or more external devices 66 such as a keyboard, a pointing device, a display 68, and/or any similar devices (e.g., network card, modem, etc.) that enable the computing device 38 to communicate with the server 34 (FIG. 6). Such communication may occur via Input/Output (I/O) interfaces 70. Alternatively, the computing devices 18 may communicate with one or more networks such as a local area network (LAN), a general wide area network (WAN), and/or a public network (e.g., the network 44 shown in FIG. 6) via a network adapter 72. As depicted, the network adapter 72 may communicate with the other components of the computing device 38 via the bus 56.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 60) may be utilized. In the context of this disclosure, a computer readable storage medium may be any tangible or non-transitory medium that can contain, or store a program (for example, the program product 62) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Referring to FIGS. 10-14, operation of the wheel 10 and the sweepstakes method may be disclosed. In operation, the sweepstakes/raffle entries are issued sequentially beginning with "0" and coded to the place and time of the drawing. For example, in operation for a drawing at a VFW club, the Feb14-VFW progression of drawing entries in the sweepstake would be as follows: Feb14-VFW . . . 000, Feb14-VFW . . . 001, Feb14-VFW . . . 002, Feb14-VFW . . . 003 Feb14-VFW . . . 004, and so forth. To guarantee a winner, every number in sequence must be assigned to an entry with no gaps. The total number of entries is the only information needed to use the wheel 10 to determine a winning entry.

The total number of entries plus 1 may be shown on a display 27. Each drawing will take either the number of spins equal to, or one less than, the total number of digits in the total entry number. Thus, if there are 101, entries, i.e., tickets, where the Highest Number Issued is 100, then the drawings may take either 2 or 3 spins. In the present embodiment shown, 6431 entries were made so the 6432 may be shown on the display 27. Thus, the drawing may take 3 or 4 spins.

The process is to begin with the right most digit (assumes total entries is 11 or greater) and to spin the wheel 10 with the pointer engaging the ring 10B that includes all digit number possibilities 0-9 in order to identify each digit in a winning entry up to the last digit in the spinning process, which is the first digit in the winning entry. Prior to a contestant spinning the wheel 10, the contestant may make a guess on what number the contestant may spin. If the contestant guesses the correct number to be spun, the contestant may win a prize. In the present embodiment, the contestant guessed 9. However, the contestant spun the number 5 on the wheel 10. Thus, the contestant may not win a prize based on the spin. On the next spin, the contestant again selects 9 as the number to be spun. However, the contestant spun the number 7 on the wheel 10 and again does not win a prize based on the spin. On the third spin, the contestant again selects 9 as the number to be spun. On this spin, the wheel 10 does land on 9 and the contestant may win a prize based on the spin. The operator keeps track and records the results of each spin for each digit of the total entries number on the display 27. After spinning the second to last digit in the spinning cycle, or the second digit in the total number of entries, if the total for all spun digits up to the second digit in the total number of entries is greater than the total of the total entry digits up to the second digit in the total number of entries, then the wheel will have to be spun on the ring 10B that addresses the number that is one less than the first digit in the total entry number; if that number is one no spin is required and the result of the prior spins is the winning number. If the spin total for all spun digits up to the second digit in the total number of entries is equal to or less than the total of the total entry digits up to the second digit in the total number of entries, another spin using the ring 10B that addresses the number of the first digit will be required to determine the winning entry. Only the final spin could be outside of the ring 10B that includes the integers 0-9. In the present embodiment, the total for all spun digits up to the second digit in the total number of entries (i.e., 975) is greater than the total of the total entry digits up to the second digit in the total number of entries (i.e., 432), thus the wheel 10 will have to be spun on the ring 10B that addresses the number that is one less than the first digit in the total entry number (i.e., ring 10B that has number 0-5). In the present embodiment, the contestant guesses that the number 5 will be spun. However, the contestant spun the number 4 on the wheel 10. Thus, the contestant may not win a prize based on the spin and the winning entry number may be 4975 which may be shown on the display 27. Below, additional examples may be seen.

Example 1: 11 Entries. (0-10)

| Operation | $2^{nd}$ spin, if required, the second ring 18 with 0 or 1 and the winner is either 0 or 10 | $1^{st}$ spin outer ring 16 (0-9), record result. (Hypothetical Spin Result) If any number other than 0, the number is the winner |
|---|---|---|
| Total Number of Entrees - 1 for 0 | 1 | 0 |
| Potential Spin Results | Red 0-1 is the winner | 0-9 |
| Hypothetical Spin Results | 0 | 0 |

Produces winner 00

Example 2: 11 Entries. (0-10)

| Operation | $2^{nd}$ spin, if required, the second ring 18 with 0 or 1 and the winner is either 0 or 10 | $1^{st}$ spin outer ring 16 (0-9), record result. (Hypothetical Spin Result) If any number other than 0, the number is the winner |
|---|---|---|
| Total Number of Entrees - 1 for 0 | 1 | 0 |
| Potential Spin Results | No spin needed | 0-9 |
| Hypothetical Spin Results | NA | 7 |

Produces winner 7

Example 3: 366 Entries. (0-365)

| Operation | $3^{rd}$ spin, third ring 20 (0-2). Record results. (Hypothetical Spin Results) | $2^{nd}$ spin, outer ring 16 (0-9). record result. (Hypothetical Spin Results) | $1^{st}$ spin, outer ring 16 (0-9), record result. (Hypothetical Spin Result) |
|---|---|---|---|
| Total Number of Entrees - 1 for 0 | 3 | 6 | 5 |
| Potential Spin Results | 0-2 | 0-9 | 0-9 |
| Hypothetical Spin Results | 1 | 6 | 6 |

Produces winner 166

Example 4: 366 Entries (0-365)

| Operation | $3^{rd}$ spin, second ring 18 (0-3). Record results. (Hypothetical Spin Results) | $2^{nd}$ spin, outer ring 16 (0-9). record result. (Hypothetical Spin Results) | $1^{st}$ spin, outer ring 16 (0-9), record result. (Hypothetical Spin Result) |
|---|---|---|---|
| Total Number of Entrees - 1 for 0 | 3 | 6 | 5 |
| Potential Spin Results | 0-3 | 0-9 | 0-9 |
| Hypothetical Spin Results | 0 | 5 | 6 |

-continued

| Operation | 3rd spin, second ring 18 (0-3). Record results. (Hypothetical Spin Results) | 2nd spin, outer ring 16 (0-9) record result. (Hypothetical Spin Results) | 1st spin, outer ring 16 (0-9), record result. (Hypothetical Spin Result) |
|---|---|---|---|

Produces winner 56

Example 5: 18,511 Entries (0-18,510)

| Operation | 5th spin, if required second ring 18 with 0 or 1). Record results and announce. | 4th spin, outer ring 16 (0-9). Record results. (Hypothetical Spin Results) | 3rd spin, outer ring 16 (0-9). Record results. (Hypothetical Spin Results) | 2nd spin, outer ring 16 (0-9) record result. (Hypothetical Spin Results) | 1st spin, outer ring 16 (0-9), record result. (Hypothetical Spin Result) |
|---|---|---|---|---|---|
| Total Number of Entrees - 1 for 0 | 1 | 8 | 5 | 1 | 0 |
| Potential Spin Results | No spin needed | 0-9 | 0-9 | 0-9 | 0-9 |
| Hypothetical Spin Results |  | 9 | 0 | 5 | 8 |

Produces winner 9058

Example 6: 18,511 Entries (0-18,510)

| Operation | 5th spin, if required second ring 18 with 0 or 1). Record results and announce. | 4th spin, outer ring 16 (0-9). Record results. If the result is seven or below or spin result greater than 8150 (Hypothetical Spin Results) | 3rd spin, outer ring 16 (0-9). Record results. (Hypothetical Spin Results) | 2nd spin, outer ring 16 (0-9) record result. (Hypothetical Spin Results) | 1st spin, outer ring 16 (0-9), record result. (Hypothetical Spin Result) |
|---|---|---|---|---|---|
| Total Number of Entrees - 1 for 0 | 1 | 8 | 5 | 1 | 0 |
| Potential Spin Results | 0-1 | 0-9 | 0-9 | 0-9 | 0-9 |
| Hypothetical Spin Results | 0 | 2 | 0 | 5 | 8 |

Produces winner 2058

Example 7: 87,639 Entries (0-87,639)

| Operation | 5th spin, if required second ring 18 with 0 or 1). Record results and announce. | 4th spin, outer ring 16 (0-9). Record results. If the result is seven or below or spin result greater than 7639 spin second row 18 (Hypothetical Spin Results) | 3rd spin, outer ring 16 (0-9). Record results. (Hypothetical Spin Results) | 2nd spin, outer ring 16 (0-9) record result. (Hypothetical Spin Results) | 1st spin, outer ring 16 (0-9), record result. (Hypothetical Spin Result) |
|---|---|---|---|---|---|
| Total Number of Entrees - 1 for 0 | 8 | 7 | 6 | 3 | 9 |
| Potential Spin Results | 0-8 | 0-9 | 0-9 | 0-9 | 0-9 |
| Hypothetical Spin Results | 4 | 7 | 5 | 2 | 6 |

Produces winner 47526

Example 8: 87,639 Entries (0-87,639)

| Operation | 5th spin, if required second ring 18 with 0 or 1). Record results and announce. | 4th spin, outer ring 16 (0-9). Record results. If the result is seven or below or spin result greater than 7639 spin second row 18 | 3rd spin, outer ring 16 (0-9). Record results. (Hypothetical Spin Results) | 2nd spin, outer ring 16 (0-9) record result. (Hypothetical Spin Results) | 1st spin, outer ring 16 (0-9), record result. (Hypothetical Spin Result) |
|---|---|---|---|---|---|
| Total Number of Entrees - 1 for 0 | 8 | 7 | 6 | 3 | 9 |
| Potential Spin Results | 0-7 | 0-9 | 0-9 | 0-9 | 0-9 |
| Hypothetical Spin Results | 6 | 8 | 5 | 0 | 3 |

Produces winner 68503

Example 9: 4,618,511 Entries (4,618,510+1 for Zero)

| Operation | 7th spin second ring 18 (Record Spin) | 6th spin outer row 16 (Hypothetical Spin Results) If result is greater than 618510 spin second ring 18 | 5th spin outer ring 16 (Record Spin) | 4th spin outer ring 16 (Record Spin) | 3rd spin outer ring 16 (Record Spin) | 2nd spin outer ring 16 (Record Spin) | 1st spin outer ring 16 (Record Spin) |
|---|---|---|---|---|---|---|---|
| Total Number of Entrees - 1 for 0 | 4 | 6 | 1 | 8 | 5 | 1 | 0 |
| Potential Spin Results | 0-3 | 0-9 | 0-9 | 0-9 | 0-9 | 0-9 | 0-9 |
| Hypothetical Spin Results | 2 | 6 | 2 | 0 | 9 | 5 | 8 |

Produces winner 2620958

Example 10: 4,618,511 Entries (4,618,510+1 for Zero)

| Operation | 7th spin second ring 18 (Record Spin) | 6th spin outer row 16 (Hypothetical Spin Results) If result is greater than 618510 spin second ring 18 | 5th spin outer ring 16 (Record Spin) | 4th spin outer ring 16 (Record Spin) | 3rd spin outer ring 16 (Record Spin) | 2nd spin outer ring 16 (Record Spin) | 1st spin outer ring16 (Record Spin) |
|---|---|---|---|---|---|---|---|
| Total Number of Entrees - 1 for 0 | 4 | 6 | 1 | 8 | 5 | 1 | 0 |
| Potential Spin Results | 0-3 | 0-9 | 0-9 | 0-9 | 0-9 | 0-9 | 0-9 |
| Hypothetical Spin Results | 2 | 7 | 2 | 0 | 9 | 5 | 8 |

Produces winner 2720958

The foregoing description is illustrative of particular embodiments of the invention, but is not meant to be a limitation upon the practice thereof. The following claims, including all equivalents thereof, are intended to define the scope of the invention.

What is claimed is:

1. A method of playing a sweepstakes comprising:
distributing an undetermined number of tickets, wherein the tickets are numbered numerically in order;
providing a sweepstakes wheel, the sweepstakes wheel comprising:
a wheel having a front surface;
a plurality of rings formed on the front surface, wherein a number of rings formed on the front surface ranges between 5 and 9, wherein each ring has an outer diameter and an inner diameter, wherein each ring is divided into a plurality of sections, each section having a number from 0-9, wherein a first ring is divided into 10 equal sections, the first ring being an outmost ring, a second ring adjacent to the first ring, the second ring divided into a plurality of sections wherein a total number of sections for the second ring is less than 10, a third ring adjacent to the second ring, the third ring divided into a plurality of sections wherein a total number of sections for the third ring is less than the total number of sections for the second ring, a fourth ring adjacent to the third ring, the fourth ring divided into a plurality of sections wherein a total number of sections for the fourth ring is less than the total number of sections for the third ring and a fifth ring adjacent to the fourth ring, the fifth ring divided into a plurality of sections wherein a total number of sections for the fifth ring is less than the total number of sections for the fourth ring;

a plurality of slowing devices extending out from a perimeter of each of the plurality of rings, wherein the slowing devices for each ring increases in size with a length for each of the plurality of slowing devices for the first ring being the smallest and a length for each of the plurality of slowing devices for an inner most ring being the longest;

a plurality of pointers, each pointer associated with only one of the plurality of rings, wherein only one of the pointers is used during a spin to identify a selected section in a selected one of the plurality of rings;

a stand for holding the wheel; and a securing device to secure the wheel to the stand and to allow the wheel to rotate on the stand;

determining a total number of the tickets distributed;

guessing a number to be spun on the wheel when the wheel is spun a first time, wherein a prize is awarded if the guess is correct;

spinning the wheel the first time with the pointer engaging an outer ring of the plurality of rings to determine a first number of a winning ticket, the first number being a rightmost digit of the winning ticket;

recording the first number of the winning ticket indicated by the pointer after spinning the wheel the first time;

declaring the winning ticket when the first number indicated on the outer ring is greater than a rightmost digit of the total number of the tickets distributed when the total number of the tickets distributed is a double-digit number;

guessing a number to be spun on the wheel when the wheel is spun a second time, wherein a prize is awarded if the guess is correct;

spinning the wheel the second time to determine a second number of a winning ticket, the second number being adjacent and to the left of the rightmost digit of the winning ticket when the first number indicated on the outer ring is less than a rightmost digit of the total number of the tickets distributed and the total number of the tickets distributed is a double-digit number or larger, the pointer engaging a ring of the plurality of rings that addresses a number that is one less than a right most digit of the total number of the tickets distributed when the total number of the tickets distributed is a double-digit number;

recording the second number of the winning ticket indicated by the pointer after spinning the wheel the second time; and declaring the winning ticket when the first number of the winning ticket and the second number of the winning ticket are recorded and the total number of the tickets distributed is the double-digit number.

2. The method of claim 1, comprising:

spinning the wheel the second time to determine the second number of the winning ticket with the pointer engaging the outer ring of the plurality of rings, the second number being adjacent and to the left of the rightmost digit of the winning ticket when the first number indicated on the outer ring is less than a rightmost digit of the total number of the tickets distributed and the total number of the tickets distributed is larger a three digit number;

recording the second number of the winning ticket indicated by the pointer after spinning the wheel the second time;

declaring the winning ticket when the first number indicated on the outer ring and the second number indicated on the outer ring is greater than a two rightmost digits of the total number of the tickets distributed when the total number of the tickets distributed is the three digit number;

guessing a number to be spun on the wheel when the wheel is spun a third time, wherein a prize is awarded if the guess is correct;

spinning the wheel the third time to determine a third number of the winning ticket, the third number being adjacent and to the left of the second digit of the winning ticket when the first number and second indicated on the outer ring is less than a two rightmost digits of the total number of the tickets distributed and the total number of the tickets distributed is the three digit number, the pointer engaging a ring of the plurality of rings that addresses a number that is one less than a second right most digit of the total number of the tickets distributed, the total number of the tickets distributed is the three digit number;

recording the third number of the winning ticket indicated by the pointer after spinning the wheel the third time; and declaring the winning ticket when the first number of the winning ticket, the second number of the winning ticket and the third number of the winning ticket are recorded and the total number of the tickets distributed is the three digit number.

3. The method of claim 2, comprising:

spinning the wheel the third time to determine the third number of the winning ticket with the pointer engaging the outer ring of the plurality of rings, the third number being adjacent and to the left of the second digit of the winning ticket when the first number indicated on the outer ring and second number indicated on the outer ring is less than a two rightmost digits of the total number of the tickets distributed and the total number of the tickets distributed is a four digit number;

recording the third number of the winning ticket indicated by the pointer after spinning the wheel the third time;

declaring the winning ticket when the first number indicated on the outer ring, the second number indicated on the outer ring and the third number indicated on the outer ring is greater than a three rightmost digits of the total number of the tickets distributed when the total number of the tickets distributed is the four digit number;

spinning the wheel a fourth time to determine a fourth number of the winning ticket, the fourth number being adjacent and to the left of the third digit of the winning ticket when the first number indicated on the outer ring, the second indicated on the outer ring and the third number indicated on the outer ring is less than the three rightmost digits of the total number of the tickets distributed and the total number of the tickets distributed is the four digit number, the pointer engaging a ring of the plurality of rings that addresses a number that is one less than a third right most digit of the total number of the tickets distributed, the total number of the tickets distributed is the four digit number;

recording the fourth number of the winning ticket indicated by the pointer after spinning the wheel the fourth time; and declaring the winning ticket when the first number of the winning ticket, the second number of the winning ticket, the third number of the winning ticket and the fourth number of the winning ticket are recorded and the total number of the tickets distributed is the four digit number.

4. The method of claim 3, comprising:

spinning the wheel the fourth time to determine the fourth number of the winning ticket with the pointer engaging the outer ring of the plurality of rings, the fourth number being adjacent and to the left of the third digit of the winning ticket when the first number indicated on the outer ring, the second number indicated on the outer ring, and the third number indicated on the outer ring is less than a three rightmost digits of the total number of the tickets distributed and the total number of the tickets distributed is a five digit number;

recording the fourth number of the winning ticket indicated by the pointer after spinning the wheel the fourth time;

declaring the winning ticket when the first number indicated on the outer ring, the second number indicated on the outer ring, the third number indicated on the outer ring and the fourth number indicated on the outer ring is greater than a four rightmost digits of the total number of the tickets distributed when the total number of the tickets distributed is the five digit number;

spinning the wheel a fifth time to determine a fifth number of the winning ticket, the fifth number being adjacent and to the left of the fourth digit of the winning ticket when the first number indicated on the outer ring, the second indicated on the outer ring, the third number indicated on the outer ring and the fourth number indicted on the outer ring is less than the four rightmost digits of the total number of the tickets distributed and the total number of the tickets distributed is the five digit number, the pointer engaging a ring of the plurality of rings that addresses a number that is one less than a fourth right most digit of the total number of the tickets distributed, the total number of the tickets distributed is the five digit number;

recording the fifth number of the winning ticket indicated by the pointer after spinning the wheel the fifth time; and declaring the winning ticket when the first number of the winning ticket, the second number of the winning ticket, the third number of the winning ticket, the fourth number of the winning ticket and the fifth number of the winning ticket are recorded and the total number of the tickets distributed is the five digit number.

5. The method of claim 4, comprising:

spinning the wheel the fifth time to determine the fifth number of the winning ticket with the pointer engaging the outer ring of the plurality of rings, the fifth number being adjacent and to the left of the fourth digit of the winning ticket when the first number indicated on the outer ring, the second number indicated on the outer ring, the third number indicated on the outer ring and the fourth number on the outer ring is less than a four rightmost digits of the total number of the tickets distributed and the total number of the tickets distributed is a six digit number;

recording the fifth number of the winning ticket indicated by the pointer after spinning the wheel the fifth time;

declaring the winning ticket when the first number indicated on the outer ring, the second number indicated on the outer ring, the third number indicated on the outer ring, the fourth number indicated on the outer ring and the fifth number indicated on the outer ring is greater than a five rightmost digits of the total number of the tickets distributed when the total number of the tickets distributed is the six digit number;

spinning the wheel a sixth time to determine a six number of the winning ticket, the six number being adjacent and to the left of the fifth digit of the winning ticket when the first number indicated on the outer ring, the second indicated on the outer ring, the third number indicated on the outer ring, the fourth number indicted on the outer ring and the fifth number indicated on the outer ring is less than the five rightmost digits of the total number of the tickets distributed and the total number of the tickets distributed is the six digit number, the pointer engaging a ring of the plurality of rings that addresses a number that is one less than a fifth right most digit of the total number of the tickets distributed, the total number of the tickets distributed is the six digit number;

recording the six number of the winning ticket indicated by the pointer after spinning the wheel the sixth time; and declaring the winning ticket when the first number of the winning ticket, the second number of the winning ticket, the third number of the winning ticket, the fourth number of the winning ticket, the fifth number of the winning ticket and the six number of the winning ticket are recorded and the total number of the tickets distributed is the six digit number.

6. A method of playing a sweepstakes comprising:

distributing a predetermined number of tickets, wherein the tickets are numbered numerically in order;

providing a sweepstakes wheel, the sweepstakes wheel comprising:

a wheel having a front surface;

a plurality of rings formed on the front surface, wherein each ring is divided into a plurality of sections, each section having a number from 0-9, wherein a first ring is divided into 10 equal sections, each succeeding ring being smaller in size and divided into a smaller number of equal sections as a preceding ring;

a plurality of slowing devices extending out from a perimeter of each of the plurality of rings, wherein the slowing devices for each ring increases in size with a length for each of the plurality of slowing devices for the first ring being the smallest and a length for each of the plurality of slowing devices for an inner most ring being the longest;

a plurality of pointers, each pointer is associated with only one of the plurality of rings, wherein only one of the pointers is used during a spin to identify a selected section in a selected one of the plurality of rings;

a stand for holding the wheel; and a securing device to secure the wheel to the stand and to allow the wheel to rotate on the stand;

determining a total number of the tickets distributed;

guessing a number to be spun on the wheel when the wheel is spun a first time, wherein a prize is awarded if the guess is correct;

spinning the wheel a plurality of times, the plurality of times equal to a number of position digits in the total number of the tickets distributed minus one (1), wherein each spin of the wheel, the pointer engages a desired ring of the plurality of rings that has all digit number possibilities 0-9 in order to identify each digit in a winning sweepstakes number ticket up to a leftmost digit;

recording each number indicated by the pointer after each spin of the wheel;

declaring the winning ticket when the winning sweepstakes number created by lining up all numbers spun from right to left during the plurality of spins is greater than the total number of the tickets distributed with the leftmost number removed;

spinning the wheel one additional time to determine a rightmost number of the winning sweepstakes number when the when the winning sweepstakes number created by lining up all numbers spun from right to left during the plurality of spins is less than the total number of the tickets distributed with the leftmost number removed.

7. The method of claim 6, comprising:

recording a leftmost number of the winning sweepstakes number indicated by the pointer after spinning the wheel the one additional time; and declaring the winning sweepstakes number after the leftmost number of the winning sweepstakes number is determined by the one additional spin.

\* \* \* \* \*